United States Patent
Rataj et al.

(10) Patent No.: US 6,289,294 B1
(45) Date of Patent: Sep. 11, 2001

(54) METHOD FOR DETERMINING ROTATIONAL DATA USING AN ENCODER DEVICE

(75) Inventors: David H. Rataj, Saline; Marvin L. Frinkle, Gregory; Elliezer P. Freyre, Chelsea, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/251,542

(22) Filed: Feb. 17, 1999

(51) Int. Cl.[7] .................................................. G01P 3/00
(52) U.S. Cl. ..................... 702/145; 702/148; 250/231.13
(58) Field of Search ................................. 702/141–149; 324/160, 162, 166–167; 701/70, 71, 74, 79; 250/231.13, 231.17, 231.18

(56) References Cited

U.S. PATENT DOCUMENTS

| | | |
|---|---|---|
| 3,760,167 | 9/1973 | Schrimshaw . |
| 3,908,116 | 9/1975 | Bjornsen . |
| 4,667,297 * | 5/1987 | Kawai ................................ 702/147 |
| 4,884,227 * | 11/1989 | Watanabe ........................... 702/148 |
| 5,099,443 * | 3/1992 | Higashimata et al. ............. 702/141 |
| 5,130,641 | 7/1992 | Cornwall et al. . |
| 5,499,189 | 3/1996 | Seitz . |
| 5,699,252 | 12/1997 | Citron et al. . |
| 6,043,483 * | 3/2000 | Schreiber ....................... 250/231.13 |

* cited by examiner

Primary Examiner—Marc S. Hoff
Assistant Examiner—Bryan Bui
(74) Attorney, Agent, or Firm—Mark P. Calcaterra

(57) ABSTRACT

A method is provided for determining rotational data from a random pulse pair generated by an encoder device, comprising the steps of: (a) monitoring the rotation of the rotating member using the encoder device; (b) receiving a plurality of pulses from the encoder device, where each of the pulses is indicative of a rotational distance that has been traveled by the rotating member; (c) storing a time value for each of the pulses that has occurred during the previous revolution of the rotating member; (d) identifying a first pulse and a second pulse that have occurred in the current revolution of the rotating member; (e) computing a time difference between the first pulse and the second pulse using a first time value for the first pulse that corresponds to the current revolution of the rotating member and a second time value for the second pulse that corresponds to a previous revolution of the rotating member; and then (f) using the time difference to determine a rotational speed, thereby determining rotational data for the rotating member from the random pulse pair.

8 Claims, 8 Drawing Sheets

METHOD FOR DETERMINING ROTATIONAL DATA USING AN ENCODER DEVICE

BACKGROUND OF THE INVENTION

1. Field of the Invention

The present invention relates generally to a method for determining rotational data from a random pulse pair generated by an encoder device and, more particularly, to a method for determining rotational data that minimizes the effect of a cyclical anomaly that is associated with the output of an encoder device.

2. Discussion

Encoder devices are commonly used to monitor the rotation of instrumented vehicle wheels and other rotating devices. Physical inaccuracies inherent in any real system give rise to an anomaly or scattering in the actual measurement process, which we will refer to as "jitter" in the measured data. Since this jitter is repetitive in nature, it can be cancelled with an appropriate algorithm.

Traditional approaches for deriving angular position or linear displacement in the case of a wheel has been to sum received pulses from the encoder device. This approach is not affected by the jitter contained in the signal, and thus the present invention does not address distance measurements.

There are at least two methods commonly used for determining speed from an encoder signal. The first and most common method is to sum pulses over a fixed period of time (i.e., the frequency method). The calculation for this method is speed=(sum of pulses/time interval)*(rotational distance). In order to get acceptable resolution for the velocity calculation, the time interval must be large enough to see many pulses which in turn has the effect of limiting update rates. The second method uses the time interval between successive pulses to determine an instantaneous speed (i.e., the period method). The period method can give an updated speed value as each pulse arrives from the encoder, but it exhibits jitter in the measured data.

Therefore, it is desirable to provide a method for determining rotational data from a random pulse pair generated by an encoder device that minimizes the effect of the cyclical anomaly or jitter that is associated with the output of an encoder device.

SUMMARY OF THE INVENTION

In accordance with the present invention, a method is provided for determining rotational data from a random pulse pair generated by an encoder device, comprising the steps of: (a) monitoring the rotation of the rotating member using the encoder device; (b) receiving a plurality of pulses from the encoder device, where each of the pulses is indicative of a rotational distance that has been traveled by the rotating member; (c) storing a time value for each of the pulses that has occurred during the previous revolution of the rotating member; (d) identifying a first pulse and a second pulse that have occurred in the current revolution of the rotating member; (e) computing a time difference between the first pulse and the second pulse using a first time value for the first pulse that corresponds to the current revolution of the rotating member and a second time value for the second pulse that corresponds to a previous revolution of the rotating member; and then (f) using the time difference to determine a rotational speed, thereby determining rotational data for the rotating member from the random pulse pair.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
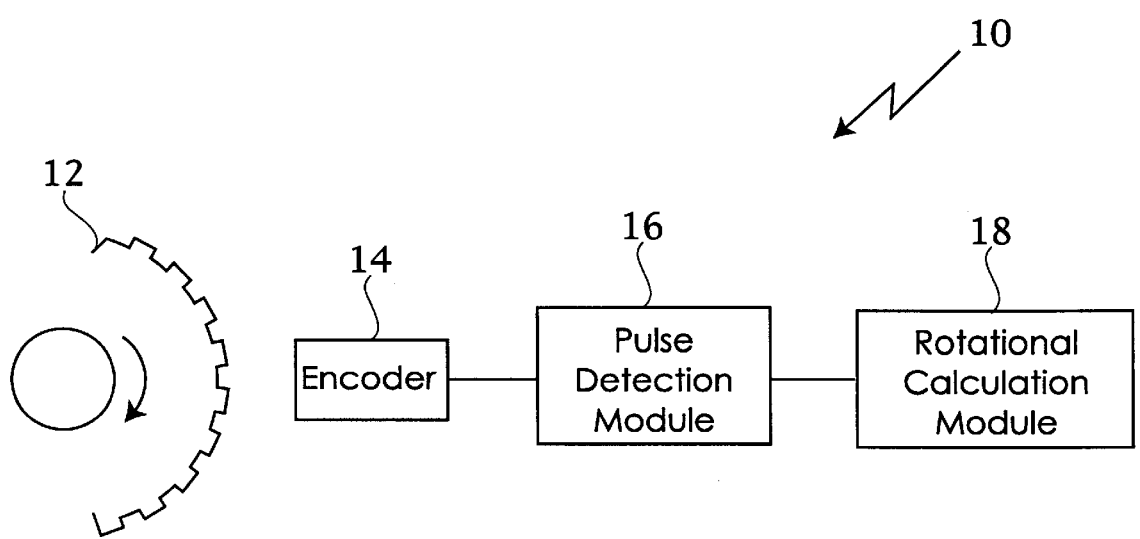
FIG. 1 is a block diagram showing the components of a rotational measurement system in accordance with the present invention.

A rotational measurement system 10 is depicted in FIG. 1. The rotational measurement system 10 includes a rotor 12, an encoder device 14, a pulse detection module 16 and a rotational calculation module 18. The rotor 12 is adapted to rotate with a rotatable member (not shown), such as a vehicle wheel. To monitor its rotation, the encoder device 14 is provided in close proximity to the rotor 12. For the following description, an encoder device is any device that outputs an event (i.e., a pulse) that is indicative of the rotational distance or rotational angle traveled by the rotating member. One skilled in the art will readily recognize that the methodology of the present invention is applicable to any such encoder device.

In an exemplary embodiment, the rotor 12 is formed as a timing gear consisting of magnetic material and a multiplicity of timing teeth which protrude to provide the outer surface of the timing gear. The encoder device 14 includes a sensor which is composed of a permanent magnet and a coil, such that it can detect the rotation of the timing gear as a change in the magnetic resistance. The flux of the magnetic field formed by the permanent magnet is variable depending upon the relative position of the encoder device 14 in relation to the teeth on the outer surface of the rotor 12. Since the teeth are arranged on the circumference of the rotor 12 at regular intervals, the output voltage becomes an alternating waveform, such as a sine wave. The voltage signal is then input into a wave shaping circuit which shapes the alternating waveform into a pulse train signal. In this way, the pulse signal is indicative of the rotational distance that has been traveled by the rotating member. Although the above description references a particular type of rotor 12 and encoder device 14, this is not intended as a limitation on the broader aspects of the present invention. On the contrary, other types of rotors and encoder devices (e.g., using an optical sensor) may be used to monitor the rotation of the rotating member.

Physical inaccuracies inherent in the encoder device 14 give rise to an anomaly or jitter in the actual measured data.

Figure 2:
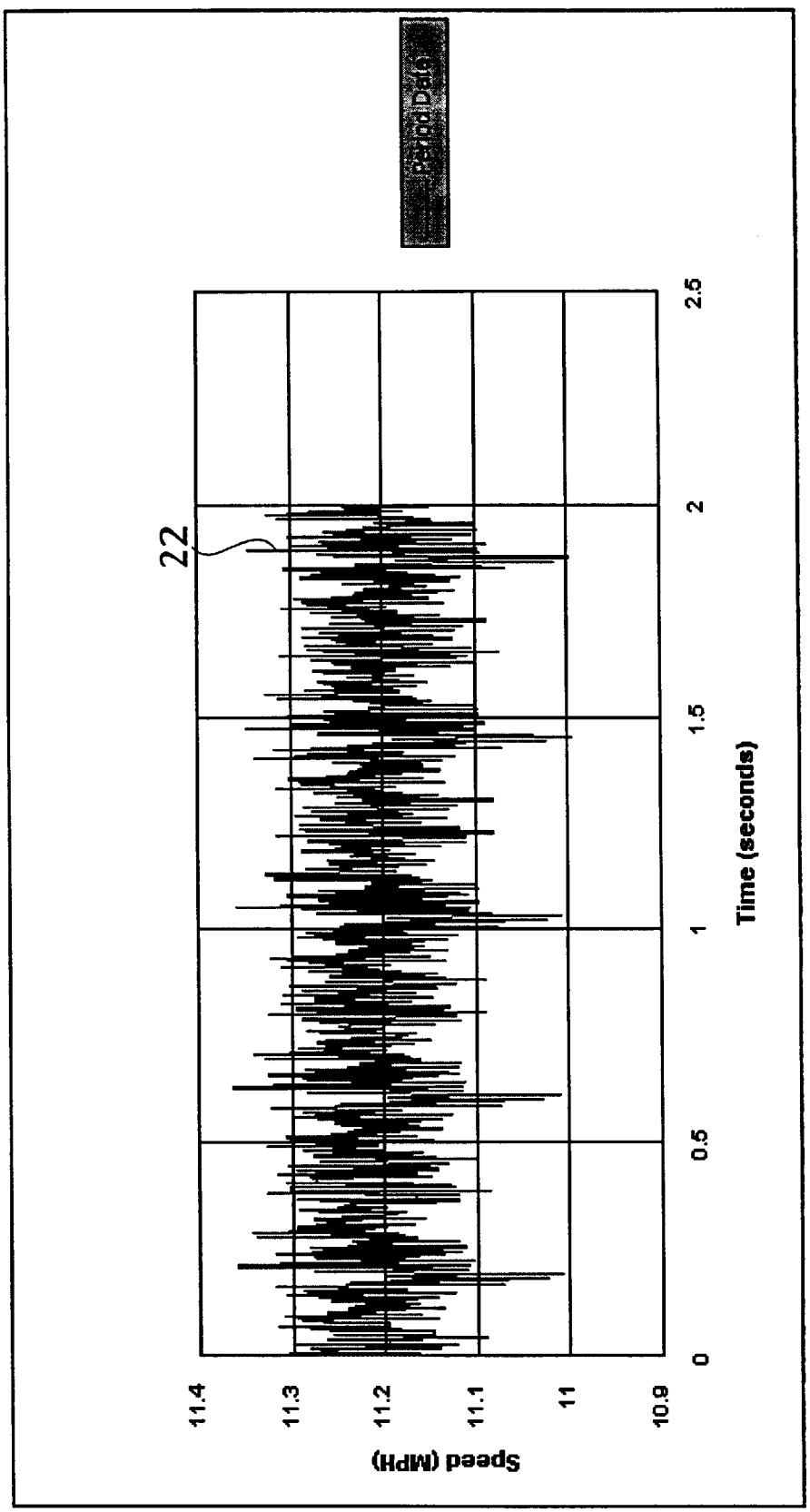
FIG. 2 illustrates a jitter pattern that is associated with the output from a typical encoder device.
Figure 3:
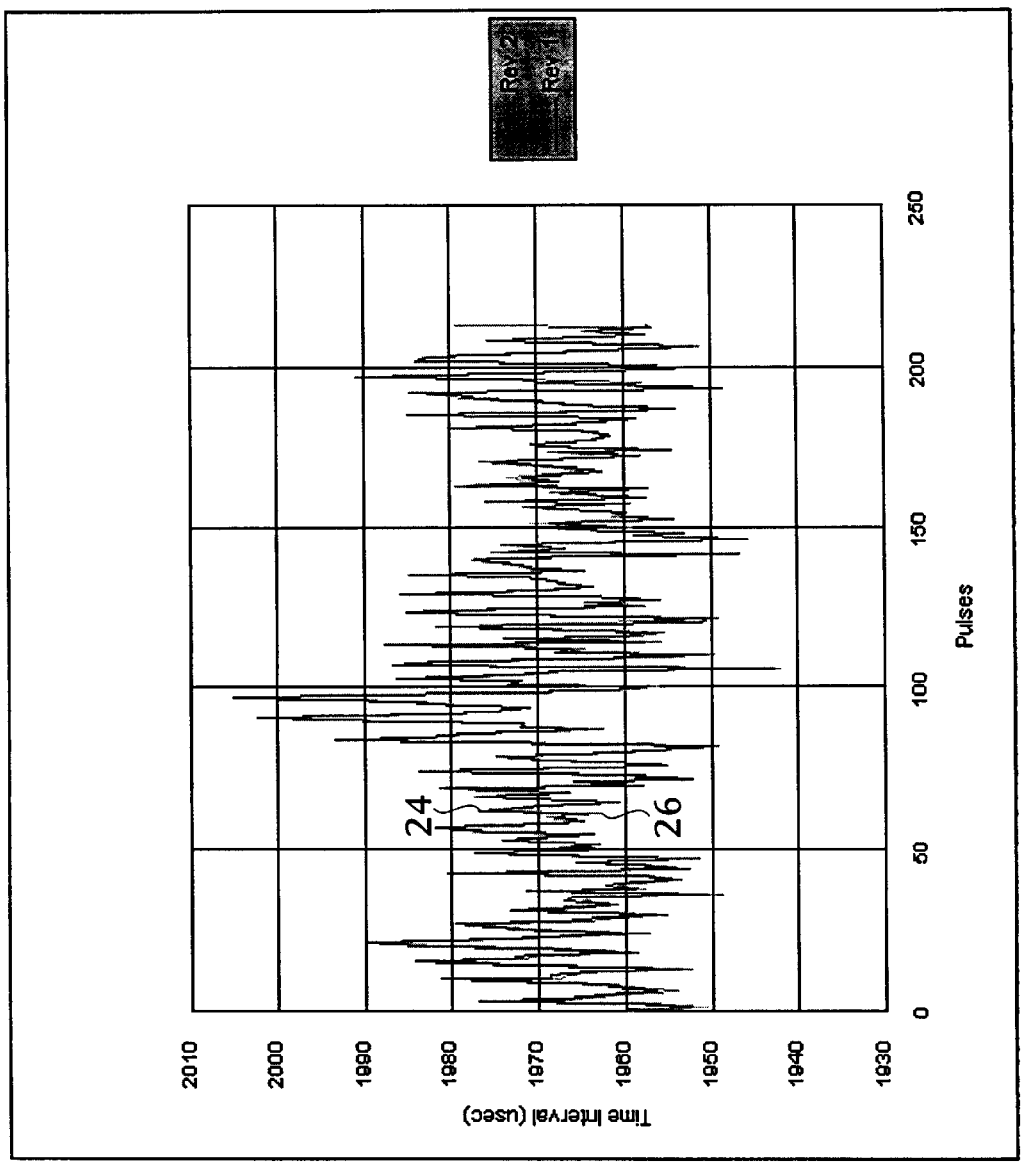
FIG. 3 illustrates that the jitter pattern is cyclical in that it is repeated for each revolution of a typical encoder device.

The repetitive nature of the jitter 22 can be seen from an examination of FIG. 2, which contains roughly four and one half wheel revolutions of period data. In FIG. 3, two of the wheel revolutions are plotted together to demonstrate how much of the signal jitter is repetitive and therefore can be cancelled with an appropriate algorithm. The rotational measurement system 10 of the present invention uses the repetitive nature of the jitter to effectively eliminate it from the encoder output.

Generally, the rotational measurement system 10 uses stored timestamp data values to remove the jitter from the encoder signal in real-time as the pulses are detected. Returning to FIG. 1, the pulse detection module 16 stores a timestamp for each pulse detected during one cycle in which the jitter repeats itself. To do so, a data table is allocated with storage enough to hold a timestamp value for each of these pulses. During the first cycle, the table is filled with timestamp values as the pulses are detected. When the nth+1 pulse is detected, the timestamp value stored in the first location of the table is copied into a temporary location and the newly detected timestamp value is put into the vacated first location of the data table.

Based on this stored data, the rotational calculation module 18 is then able to determine rotational data for the rotating member. The timestamp value stored in the temporary location is subtracted from a newly detected timestamp value. This time difference value is a delta time between the two pulses which can in turn be used to compute rotational speed for the rotating member (e.g., rotational speed= distance between pulses/delta time). As each additional timestamp value arrives, it is stored in the data table and the previously stored value is subtracted to produce a new speed value. In this way, the updated rate is equal to the incoming pulse stream rate. Since the physical variations causing the jitter do not vary from cycle to cycle, the effect of the jitter cancelled.

Figure 4A:
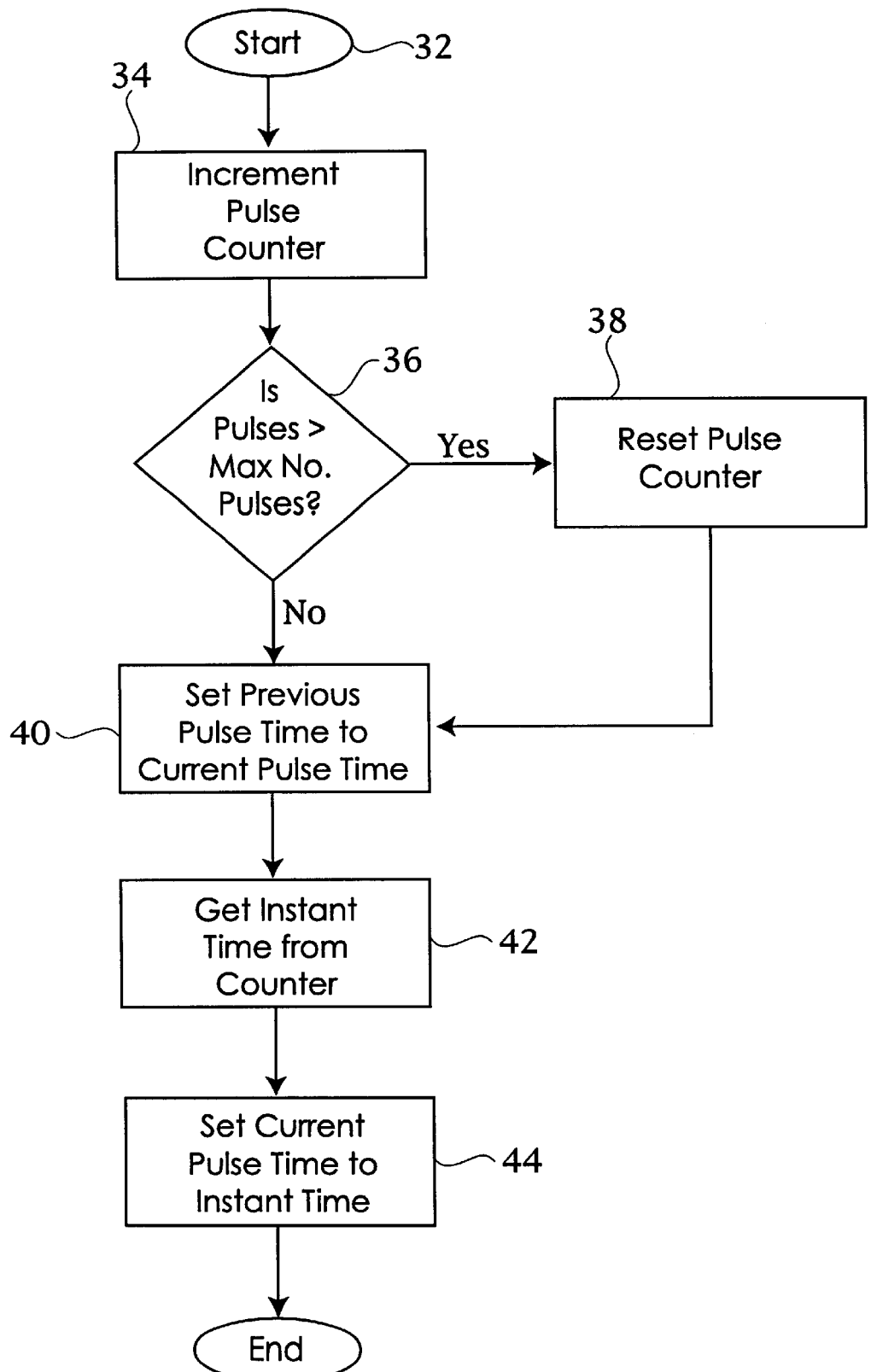
FIGS. 4a and 4b are detailed flow charts showing a preferred embodiment of a pulse detection module and a rotational calculation module, respectively, in accordance with the present invention.
Figure 4B:
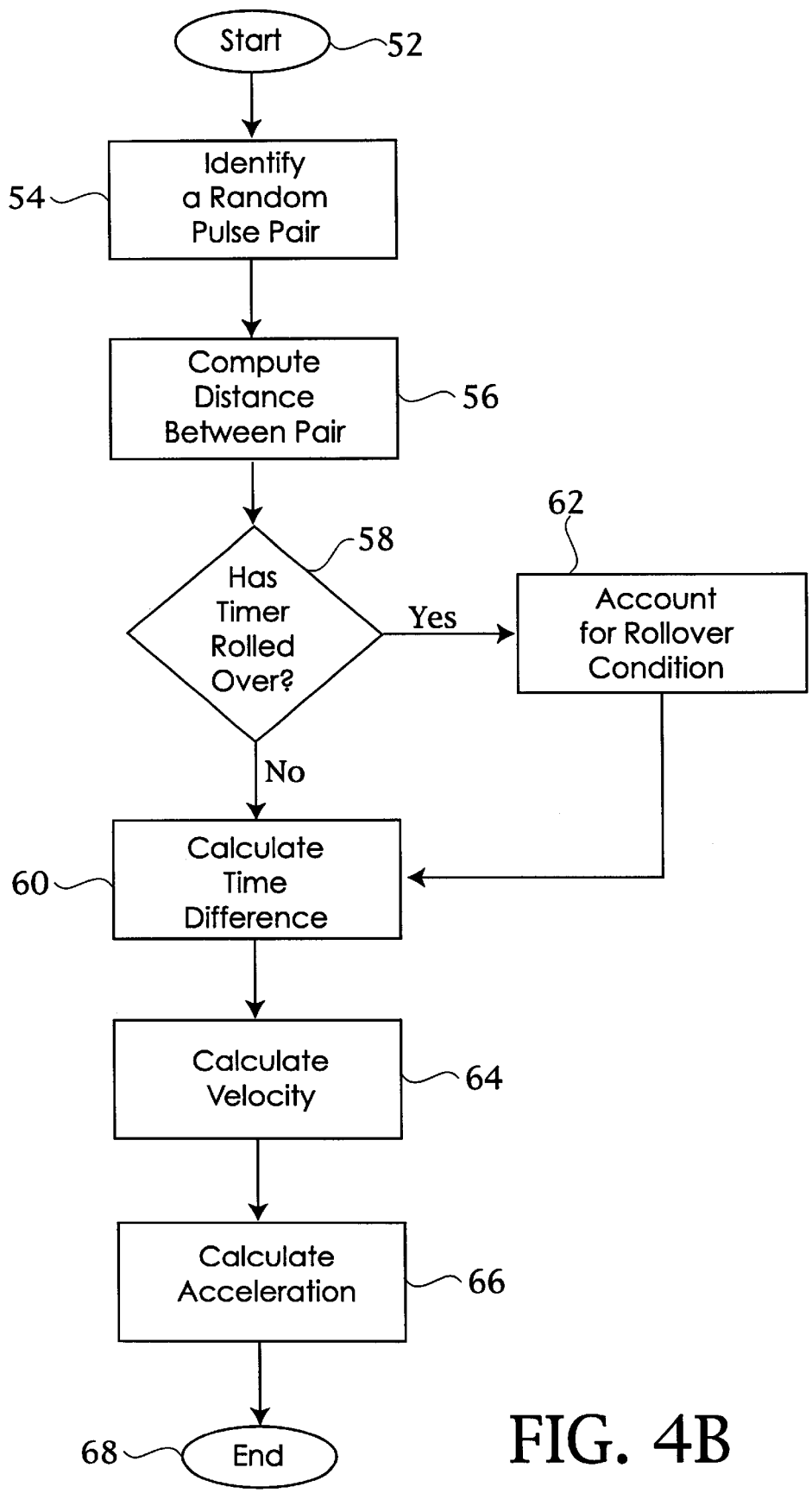

FIGS. 4a and 4b are flowcharts illustrating the preferred methodology employed by the pulse detection module 16 and the rotational calculation module 18, respectively. For each pulse received from the encoder device 14, the pulse detection module 16 stores a corresponding time value indicating when that pulse has occurred in relation to the other pulses. This is accomplished by using two arrays. A first array stores the pulse times that correspond to the current revolution of the rotating member; whereas a second array stores the pulse times that correspond to a previous revolution of the rotating member. Since the encoder device generates a predefined number of pulses for each rotation of the rotating member, the arrays are sized to hold a pulse time for each pulse that will occur during a revolution of the rotating member (i.e., a predefined maximum number pulses per revolution). Exemplary source code for the pulse detection module 16 and the rotational calculation module 18 has been included in Appendix.

Referring to FIG. 4A, pulse detection module 16 functions as an interrupt handler, such that it is executed once for each detected pulse. A pulse counter is first incremented by one in block 34. The pulse counter is a variable used to track the indices of each array. Decision block 36 determines if the pulse counter exceeds the maximum number of pulses per revolution, and if so, then the pulse counter is reset to one in block 38. Next, block 40 sets the pulse time in the second array equal to the pulse time in the first array (e.g., pulse_time_stamp1[pulse]=pulse_time_stamp2[pulse]). By using a function that returns a running count of the time, block 42 retrieves an instantaneous time value that corresponds to the current pulse. Block 44 then sets the pulse time in the first array equal to the instantaneous time (e.g., pulse_time_stamp2=time_stamp()). In this way, the pulse detection module 16 maintains a pulse time value for each of the pulses that have occurred during the last two revolutions of the rotating member.

In FIG. 4B, the rotational calculation module 18 determines the rotational speed for the rotating member. First, a random pulse pair is identified in block 54 (e.g., pulse x and pulse y). Although any two pulses associated with the current revolution of the rotating member may be used, the pulse pair is preferably comprised of the most recently received pulse and the pulse immediately preceding it. In block 56, a distance between the selected random pulse pair can be determined because each pulse signifies a predefined distance that has been traveled by the rotating member.

In a preferred embodiment of the present invention, the counter used to track time is a free running counter, such that upon reaching its maximum value, the next time tick causes it to roll over to the zero value. Prior to determining a time difference between the pulse pair, decision block 58 determines if the timer has "rolled over". A rollover condition is accounted for in block 62, if necessary. If the counter has not rolled over, block 60 computes a time difference. This is done by subtracting the first time value for the first random pulse from a second time value for the second random pulse, where the first time value corresponds to the current revolution and the second time value corresponds to the previous revolution. In other words, the first time value for the corresponding pulse is taken from the first array and the second time value for the corresponding pulse is taken from the second array (i.e., delta_time=time_stamp2[pulse x]−pulse_time_stamp1[pulse y]).

Figure 5:
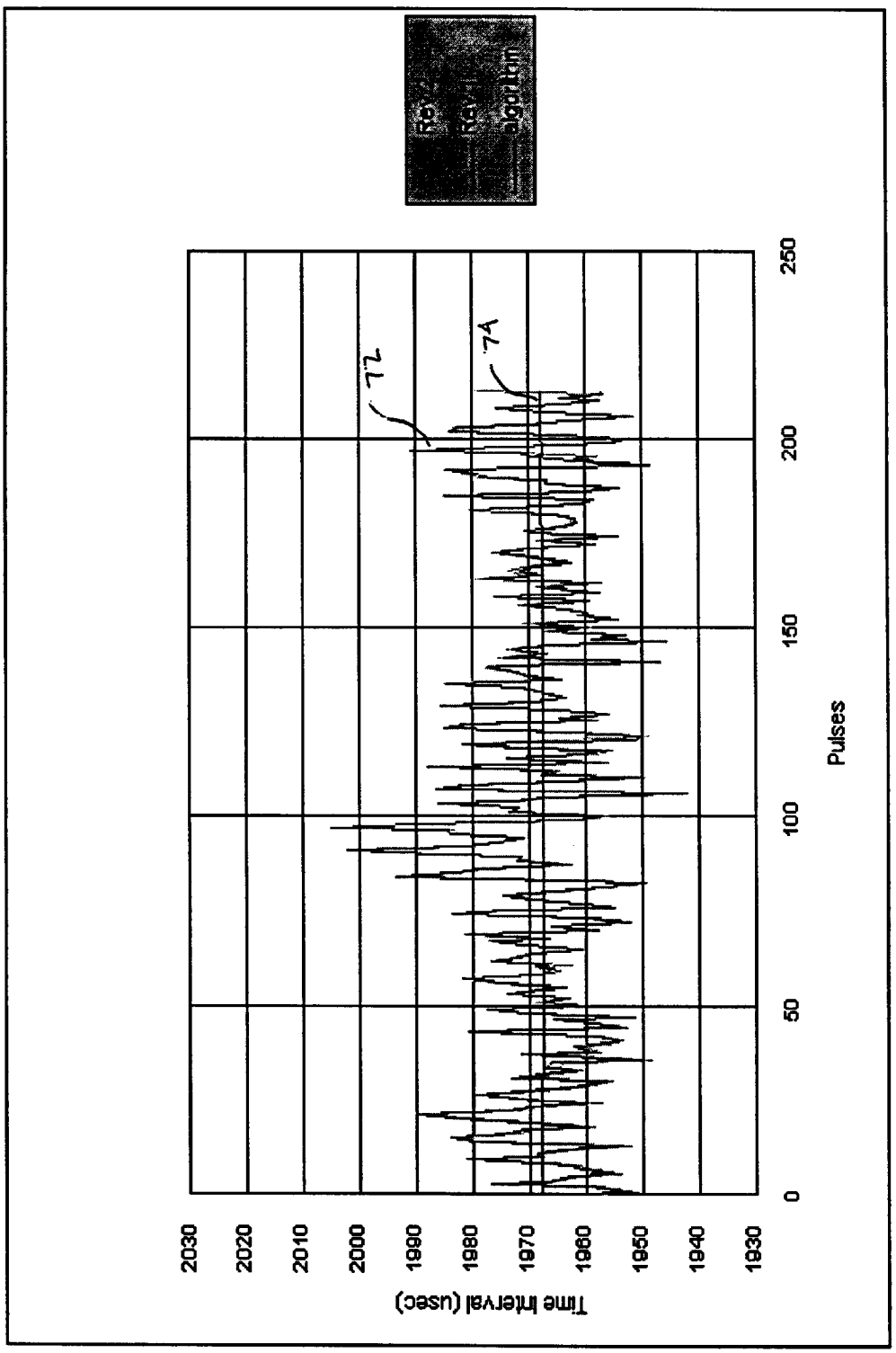
FIG. 5 illustrates the output from a conventional encoder in relation to the output from the rotational measurement system of the present invention.

Once a time difference and the corresponding distance for the pulse pair have been determined, rotational data can be computed for the rotating member. In block 64, velocity data (or a rotational speed) for the rotating member is computed, and in block 66, acceleration data is computed for the rotating member. FIG. 5 illustrates the conventional encoder output having a jitter pattern 72 in relation to the velocity data 74 as computed by the rotational measurement system 10 of the present invention.

Once the rotational measurement system 10 is fully operational, it continually re-correlates the encoder for each new revolution. At startup, the preferred embodiment of the present invention requires two revolutions of the rotating member to fill each of the arrays. As will be apparent to one skilled in the art, meaningful data for speed and velocity during the first two revolutions can be computed using conventional measurement approaches (e.g., a dual algorithm approach). It should also be noted that no other specific calibration process is required.

The above-described system and methodology for determining rotational data was implemented in a prototype velocimeter (i.e., a $5^{th}$ wheel display device). Each of these modules was written in the C programming language targeting a Transputer microprocessor. Since this microprocessor allows multiprocessing on a single machine, the pulse detection module 16 and the rotational calculation module 18 were designed to run as concurrent tasks.

Figure 6:
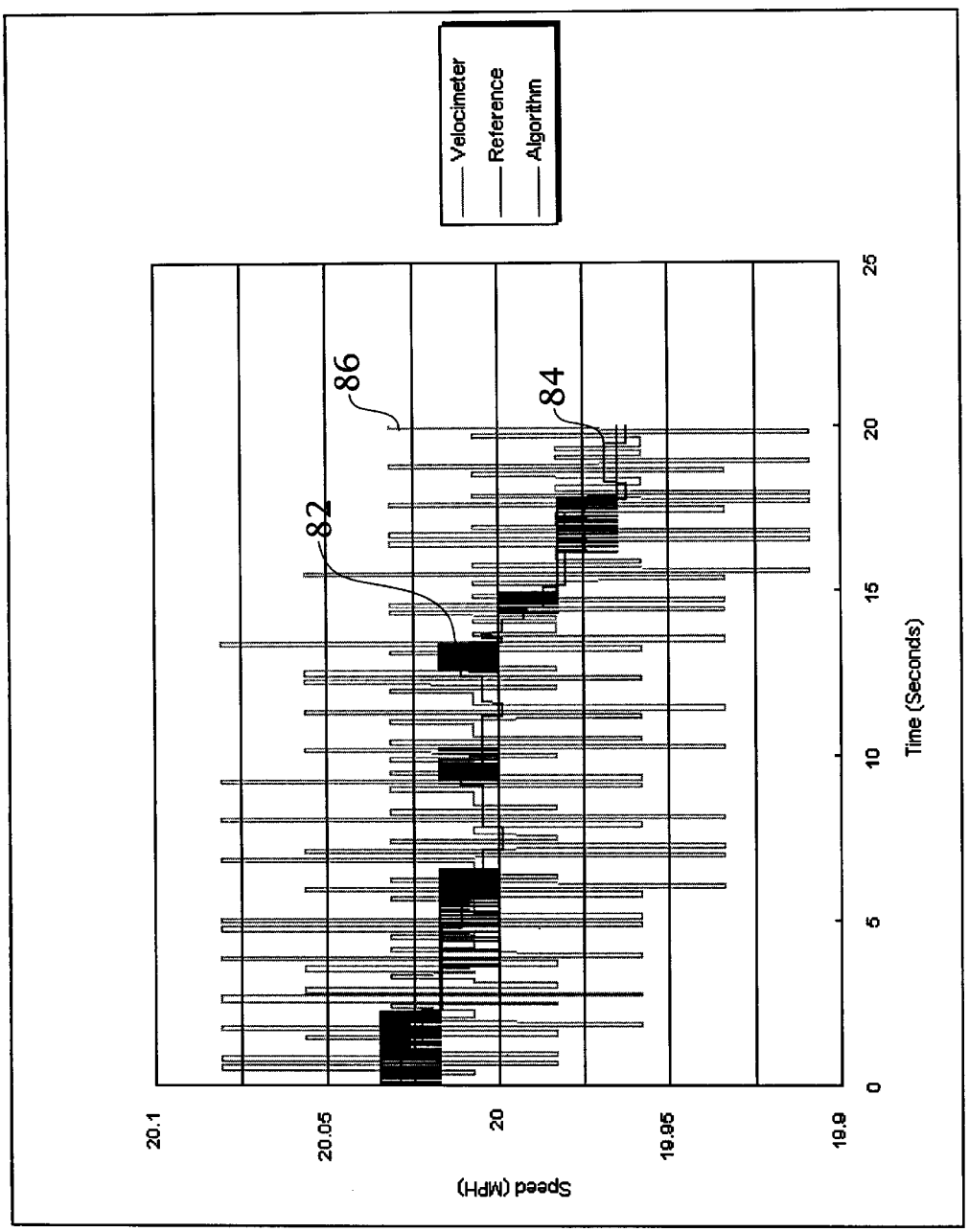
FIGS. 6 and 7 shows velocity data for a conventional in relation to velocity data velocimeter for a prototype velocimeter constructed in accordance with the present invention.
Figure 7:
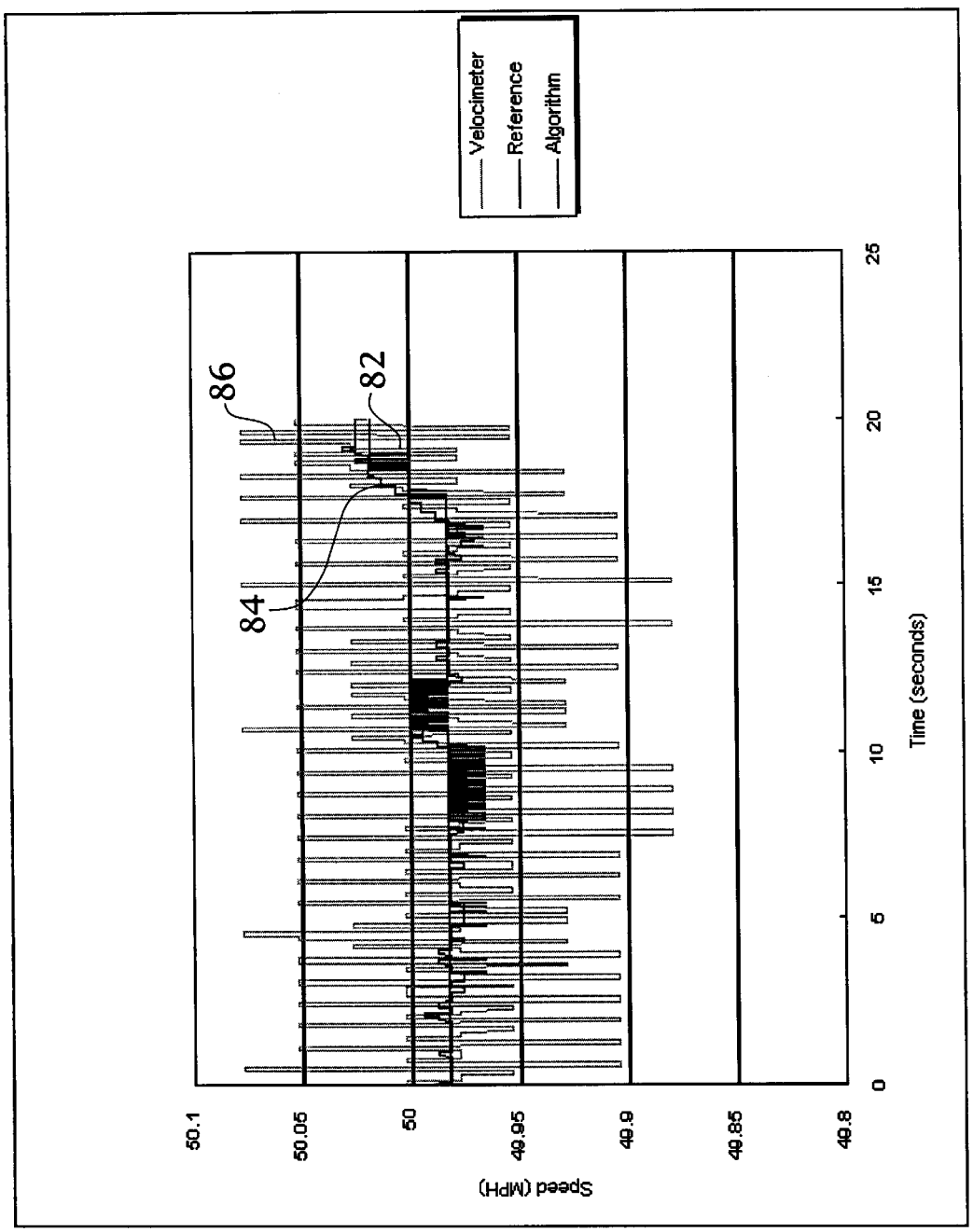

Using this prototype velocimeter, testing was performed using a Labeco $5^{th}$ wheel calibration dynamometer upon which was mounted a Nucleus $5^{th}$ wheel. The reference signal for the test sequence is an encoder, mechanically connected to the dynamometer flywheel using a belt and pulley arrangement. The test results were compared with those from a conventional velocimeter, which uses the period method averaged over eight received pulses. A Campbell Scientific CR9000 data acquisition system was used to collect the data. FIGS. 6 and 7 illustrate these test results. In both of these figures, the output from the prototype velocimeter 82 tracks the reference value 84 much closer than the output from the conventional velocimeter 86.

Due to the jitter associated with the encoder output, acceleration data is typically not collected from 5$^{th}$ wheels. However, the method for determining rotational data in accordance with the present invention significantly improves the accuracy of the velocity data. As a result, accurate acceleration data was also collected using the prototype velocimeter.

While the above description constitutes the preferred embodiment of the invention, it will be appreciated that the invention is susceptible to modification, variation, and change without departing from the proper scope or fair meaning of the accompanying claims.

```
Pulse Detection Module (executed once for each detected pulse)
    pulse = pulse +1
    if (pulse > MAX_PULSES_REVOLUTION)
        pulse = 1
        pulse_time_stamp1[pulse] = pulse_time_stamp2[pulse]
        pulse_time_stamp2[pulse] = time_stamp()
    where:pulse is a variable used to track encoder indices;
        pulse_time_stamp1 and pulse_time_stamp2 are arrays,
        such that each array contains
        MAX_PULSES_REVOLUTION entries;
        time_stamp() is a function returning a running count of time
Rotational Calculation Module
    if (pulse_time_stamp1[pulse x]>pulse_time_stamp2[pulse y])
        delta_t = pulse_time_stamp2[pulse x]-
        pulse_time_stamp1[pulse y]
    else
        delta_t = (pulse_time_stamp2[pulse x] +
        MAX_COUNT_TIME) -
        pulse_time_stamp1[pulse y]
    where:pulse x and pulse y are encoder indices;
        delta_t is the time between pulse x and pulse y
        MAX_COUNT_TIME is the largest
        time value returned by time_stamp()
```

We claim:

1. A method for determining rotational data from a random pulse pair generated by an encoder device, the encoder device being used to monitor the rotation of a rotating member, comprising the steps of:

receiving a plurality of pulses from said encoder device, such that each of said plurality of pulses being indicative of a rotational distance that has been traveled by said rotating member;

storing a time value for each of said plurality of pulses that has occurred during the two most recent revolutions of the rotating member;

identifying a first pulse and a second pulse, said first and second pulse having occurred in the most recent revolution of the rotating member;

retrieving a first time value for the first pulse corresponding to when the first pulse occurred during the most recent revolution of the rotating member;

retrieving a second time value for the second pulse corresponding to when the second pulse occurred during the second most recent revolution of the rotating member; and computing a time difference between said first pulse and said second pulse by subtracting the second time value from the first time value; and using said time difference to determine a rotational speed for the rotating member, thereby determining rotational data from the random pulse pair.

2. The method of claim 1 wherein the step of monitoring the rotation of the rotating member further comprises using a rotor adapted to rotate with the rotating member and a sensor that detects the rotation of said rotor.

3. The method of claim 1 wherein the step of receiving a plurality of pulses further comprises generating a predefined number of pulses for each rotation of said rotating member by the encoder device.

4. The method of claim 1 wherein the step of using said time difference to determine a rotational speed further comprises using said rotational speed to determine acceleration data for the rotating member.

5. A rotational measurement system for determining rotational data indicative of a rotational speed of a rotating member, comprising:

an encoder device for monitoring the rotation of the rotating member and generating a plurality of pulses indicative of a rotational distance traveled by the rotating member;

a pulse detection module receiving said plurality of pulses from said encoder and storing a time value for each of said plurality of pulses that has occurred during the two most recent revolutions of the rotating device; and a rotational calculation module connected to said pulse detection module for identifying a first and second pulse having occurred in the most recent revolution and determining rotational data for the rotating member by using a first time value corresponding to when the first pulse occurred during the most recent revolution and on a second time value corresponding to when the second pulse occurred during the second most recent revolution, where the rotational data is a time difference between the first time value from the second time value and the time difference is used to determine velocity data for the rotating member.

6. The rotational measurement system of claim 5 further comprising a rotor adapted to rotate with the rotating member and said encoder device being further defined to include a sensor that detects the rotation of said rotor.

7. The rotational measurement system of claim 5 wherein said encoder device generates a predefined number of pulses for each rotation of said rotating member.

8. The rotational measurement system of claim 5 wherein said rotational calculation module determines acceleration data for the rotating member by using said velocity data.

* * * * *